United States Patent
Tomita (10) Patent No.: US 6,908,146 B2
(45) Date of Patent: Jun. 21, 2005

(54) SIDE MEMBER OF AUTOMOBILE

(75) Inventor: Tatsuzo Tomita, Ohbu (JP)

(73) Assignee: Mitsubishi Jidosha Kogyo Kabushiki Kaisha (JP)

( * ) Notice: Subject to any disclaimer, the term of this patent is extended or adjusted under 35 U.S.C. 154(b) by 0 days.

(21) Appl. No.: 10/802,421

(22) Filed: Mar. 17, 2004

(65) Prior Publication Data

US 2004/0183340 A1 Sep. 23, 2004

(30) Foreign Application Priority Data

Mar. 17, 2003 (JP) .................................... 2003-072057

(51) Int. Cl.⁷ .............................................. B62D 25/08
(52) U.S. Cl. ............. 296/203.02; 296/204; 296/187.09; 296/30
(58) Field of Search ........................... 296/203.03, 204, 296/193.05, 29, 193.09, 205, 203.02, 187.12, 187.09, 30

(56) References Cited

U.S. PATENT DOCUMENTS

| | | | |
|---|---|---|---|
| 4,469,368 A | * | 9/1984 | Eger ..................... 296/203.02 |
| 4,822,096 A | * | 4/1989 | Fujii ..................... 296/203.02 |
| 5,125,715 A | * | 6/1992 | Kijima ................... 296/187.09 |
| 5,713,625 A | * | 2/1998 | Takahashi et al. ........... 296/204 |
| 6,361,102 B1 | * | 3/2002 | Han ....................... 296/203.02 |

FOREIGN PATENT DOCUMENTS

| | | | |
|---|---|---|---|
| JP | 3-86689 | * | 3/1991 |
| JP | 2522690 Y2 | | 10/1996 |

\* cited by examiner

Primary Examiner—Joseph D. Pape
(74) Attorney, Agent, or Firm—Rossi, Kimms & McDowell (57) ABSTRACT

A side member is a complement of a pair located on either side of the body of a vehicle so as to extend in the longitudinal direction of the vehicle body, passing under a dash panel located in the front part of the interior of the vehicle so as to cross the vehicle body. The side member comprises a front side member and a rear side member. The front side member extends rearward from the front of the vehicle body, beyond a dash plane which extends along a vertical wall of the dash panel. The rear side member extends forward from the rear of the vehicle body beyond the dash plane and is jointed to the front side member.

14 Claims, 7 Drawing Sheets

SIDE MEMBER OF AUTOMOBILE

CROSS-REFERENCE TO RELATED APPLICATIONS

This application is based upon and claims the benefit of priority from prior Japanese Patent Application No. 2003-072057, filed Mar. 17, 2003, the entire contents of which are incorporated herein by reference.

BACKGROUND OF THE INVENTION

1. Field of the Invention

The present invention relates to side members located on either side of the body of an automobile so as to extend in the longitudinal direction of the automobile.

2. Description of the Related Art

An automobile comprises a pair of side members in reinforcing members for the body of the vehicle, which are located individually on the left- and right-hand sides of the vehicle body. The side members extend rearward from the front of the vehicle body, passing under the interior of the vehicle. In the front part of the vehicle interior, the left- and right-hand side members are jointed to a cross member and a dash panel, which cross the vehicle body in its crosswise direction (see FIG. 1 of Jpn. UM Registration Publication No. 2522690, for example).

The side members include an upper panel and an under panel each. The upper panel is in the form of a flat plate and extends forward from a junction with the cross member. The under panel has a hat-shaped cross section that spreads upward. It extends forward from the junction with the cross section and extends rearward, passing under the vehicle interior along the dash panel.

The cross member has a hat-shaped cross section that spreads rearward and is jointed to that part of the dash panel which is located outside the vehicle interior. Junctions of the cross member with the side members project forward or toward the side members. Further, the opposite end portions of cross member, with respect to the direction of the vehicle width, are bent rearward. The side members and the cross member are spot-welded to one another on two surfaces, outside and inside wall surfaces with respect to the direction of the vehicle width.

The rigidity of the front part of the vehicle is enhanced by transmitting a load on the side members to the cross member through the junctions.

However, the side members and the cross member are jointed together at the junctions on the outside wall and the inside wall, and are neither on a top wall nor on a bottom wall (lower wall of the under panel). Therefore, a load of a head-on collision or lateral collision is concentrated on the joints on the outside and inside walls without being transmitted from the top and bottom walls to the cross member. Thus, the side members easily bend near their junctions with the cross member.

The upper panel (top wall) of each side member is discontinued in front of the dash panel. The inside and outside walls of the under panel of the side member are jointed to the cross member and the dash panel by means of flanges. While the vehicle is running, the side members may be twisted by a load that is transmitted from the front wheels. If the side members are not rigid, in this case, the load is concentrated on the flange portions that are jointed to the cross member and the dash panel, and a force acts to tear them off. Thus, the welded joints are easily deformed.

Junctions of the cross member to be inserted into the side members are formed by projecting the cross member by press molding. If the junctions project much, they require deep drawing, which is a hard work. Therefore, the height of projection of the junctions cannot be made greater than a certain value. Thus, it is hard to enhance the rigidity of the front part of the vehicle by increasing the strength of bond between the side members and the cross member.

BRIEF SUMMARY OF THE INVENTION

Accordingly, the present invention provides a side member having strength high enough to enhance the rigidity of the front part of a vehicle body without depending on the strength of joint with a cross member.

A side member according to the present invention is a complement of a pair located on either side of the body of a vehicle so as to extend in the longitudinal direction of the vehicle body, passing under a dash panel located in the front part of the interior of the vehicle so as to cross the vehicle body. The side member comprises a front side member and a rear side member. The front side member extends rearward from the front of the vehicle body, beyond a dash plane which extends along a vertical wall of the dash panel. The rear side member extends forward from the rear of the vehicle body beyond the dash plane and is jointed to the front side member.

Preferably, the following configuration should be further provided to enhance the strength of joint between the front side member and the rear side member. The side member comprises a brace member. One end side of the brace member is jointed to the front side member, and the other end side to the vertical wall of the dash panel.

In order to transmit a load that acts on the front side member to the rear side member efficiently, moreover, the front side member is formed having a closed section in front of the dash panel, and a closed section is also formed between the brace member and the front side member in the vicinity of the dash panel.

Alternatively, the front side member is formed of an inner member, having an upper front wall, a lower front wall, and a front inside wall, and an outer member having a front outside wall, and the brace member is jointed to the front inside wall and an upper edge flange provided on the upper edge of a top outside wall extending upward from an upper flange on the outer member of the front side member.

Alternatively, in order to make the respective closed sections of the front side member and the rear side member continuous with each other, the front side member is formed of an inner member, having an upper front wall, a lower front wall, and a front inside wall, and an outer member having a front outside wall, and the front end of the rear side member is interposed between the inner member and the outer member of the front side member. In this case, the front end of the rear side member is formed of a bottom wall, a rear inside wall, and a rear outside wall. The bottom wall is jointed to the lower front wall, the rear inside wall is jointed to the front inside wall, and the rear outside wall is jointed to the front outside wall.

The rear side member comprises an upper member, having the bottom wall, rear inside wall, and rear outside wall and defining a closed section in cooperation with the dash panel, and a lower member covering the upper member from below. Further, the upper member penetrates the front side member to a position in front of the lower member. In order to enhance the torsional rigidity of the side member, moreover, the lower member is provided with a lower upward flange on the outside edge thereof. In this case, the front end of the lower upward flange is interposed between the rear end of an inner upward flange on the outside edge of the upper front wall of the inner member and an outer upper flange on the upper side of the front outside wall of the outer member. Further, the lower member is extended outward from the rear outside wall of the upper member and jointed to the outside end of the dash panel. Furthermore, the upper member has an upper outward flange on the upper edge of the rear outside wall. The front end of the upper outward flange is jointed to a rack portion provided between the lower upward flange and the upper end of a lower outside wall overlapping the rear outside wall.

A side member of another form according to the present invention comprises a front side member and a rear side member. The front side member passes under a dash plane, which extends along a vertical wall of a dash panel, from the front of the body of a vehicle and extends rearward. The rear side member passes under the dash plane from the rear of the vehicle body and extends forward. The front side member and the rear side member are jointed together so as to overlap each other in the longitudinal direction of the vehicle.

DETAILED DESCRIPTION OF THE INVENTION

A side member 1 of an automobile according to an embodiment of the present invention will be described with reference to FIGS. 1 to 9. Prior to the description to follow, the forward (front side) and rearward (rear side) are defined with respect to a running direction F of the automobile, and the right-and left-hand sides with respect to the crosswise direction. Let it be supposed, moreover, that the direction toward the center of the automobile is the inward direction (inside) and that the direction of crosswise spread from the center of the automobile is the outward direction (outside). Let us suppose, furthermore, that the direction of action of the gravity is the downward direction (lower side) and that the direction against the gravity is the upward direction (upper side).

Figure 1:
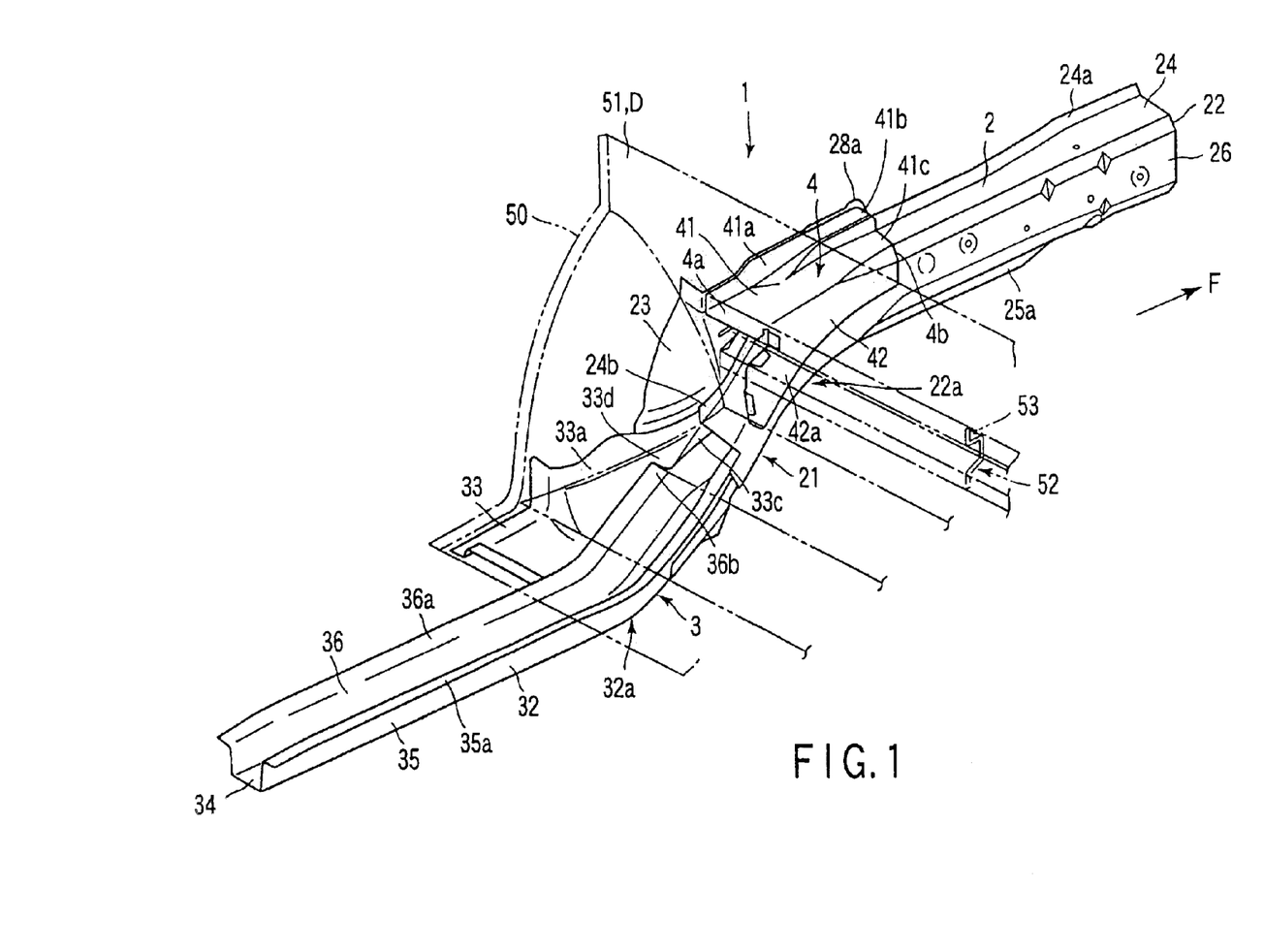
FIG. 1 is a perspective view of a left-hand side member, out of side members according to an embodiment of the present invention, taken from within and above the interior of a vehicle.
Figure 5:
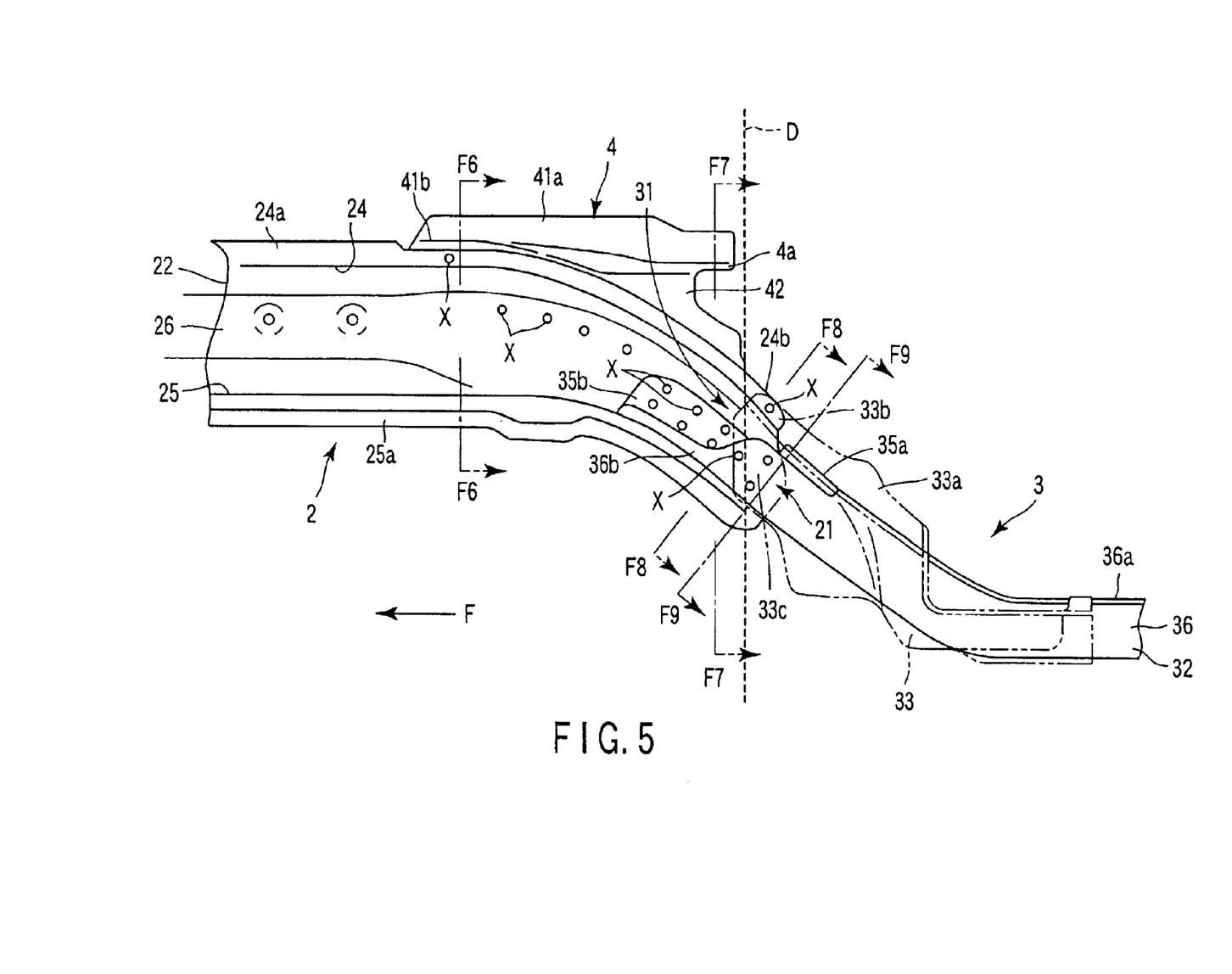
FIG. 5 is a side view of the side member of FIG. 1 cleared of its outer, taken laterally from outside the vehicle interior and illustrating a lower by two-dot chain line.

The side member 1 shown in FIG. 1 is the left-hand side member 1, out of a pair of side members that are located individually on the left-and right-hand sides of the body of the automobile so as to extend in the longitudinal direction of the automobile. Since the right-hand side member and the left-hand side member 1 are arranged bisymmetrically, a description of the former is omitted. The side member 1 extends rearward, passing under the vehicle interior, from in front of a dash panel 50 that is located in the front part of the vehicle interior so as to cross the vehicle body. The dash panel 50 has a vertical wall 51, as shown in FIG. 1, and a dash plane D is set along the vertical wall 51, as shown in FIG. 5.

As shown in FIG. 1, the side member 1 comprises a front side member 2, a rear side member 3, and a brace 4. As shown in FIG. 5, the rear part of the front side member 2 is bent downward as the dash plane D is approached from the front. A rear end 21 of the front side member 2 extends rearward beyond the dash plane D. The front part of the rear side member 3 is bent upward as the dash plane D is approached from the rear. A front end 31 of the rear side member 3 extends forward beyond the dash plane D. Further, the front end 31 of the rear side member 3 is jointed to the rear end 21 of the front side member 2 in an overlapping manner. In the present embodiment, the jointing is carried out by spot welding. Several typical spots are represented by joints X in the drawings.

Figure 2:
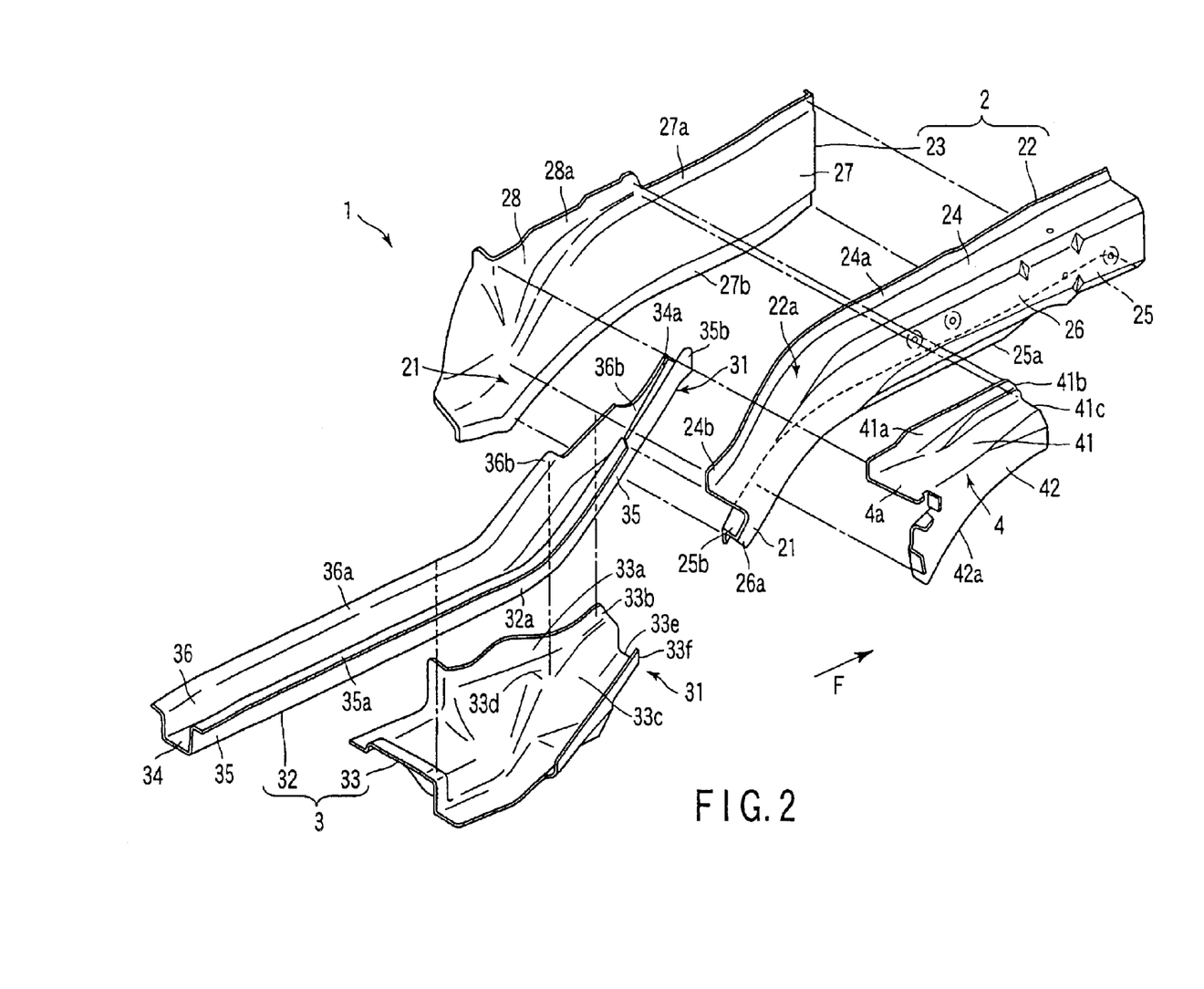
FIG. 2 is an exploded perspective view of the side member shown in FIG. 1.

As shown in FIG. 2, the front side member 2 is provided with an inner 22 and an outer 23. The inner 22 has an upper front wall 24, a lower front wall 25, and a front inside wall 26. The outer 23 has a front outside wall 27. The upper front wall 24 is formed having an inner upward flange 24a that extends upward from its outside edge. The lower front wall 25 is formed having an inner downward flange 25a that extends downward from its outside edge. The front outside wall 27 is formed having an outer upper flange 27a on the upper side and an outer lower flange 27b on the lower side. Further, the outer 23 has a top outside wall 28 that extends upward from the outer upper flange 27a. The top outside wall 28 has an upper edge flange 28a on its upper edge. The inner upward flange 24a is jointed to the outer upper flange 27a, while the inner downward flange 25a is jointed to the outer lower flange 27b.

Figure 3:
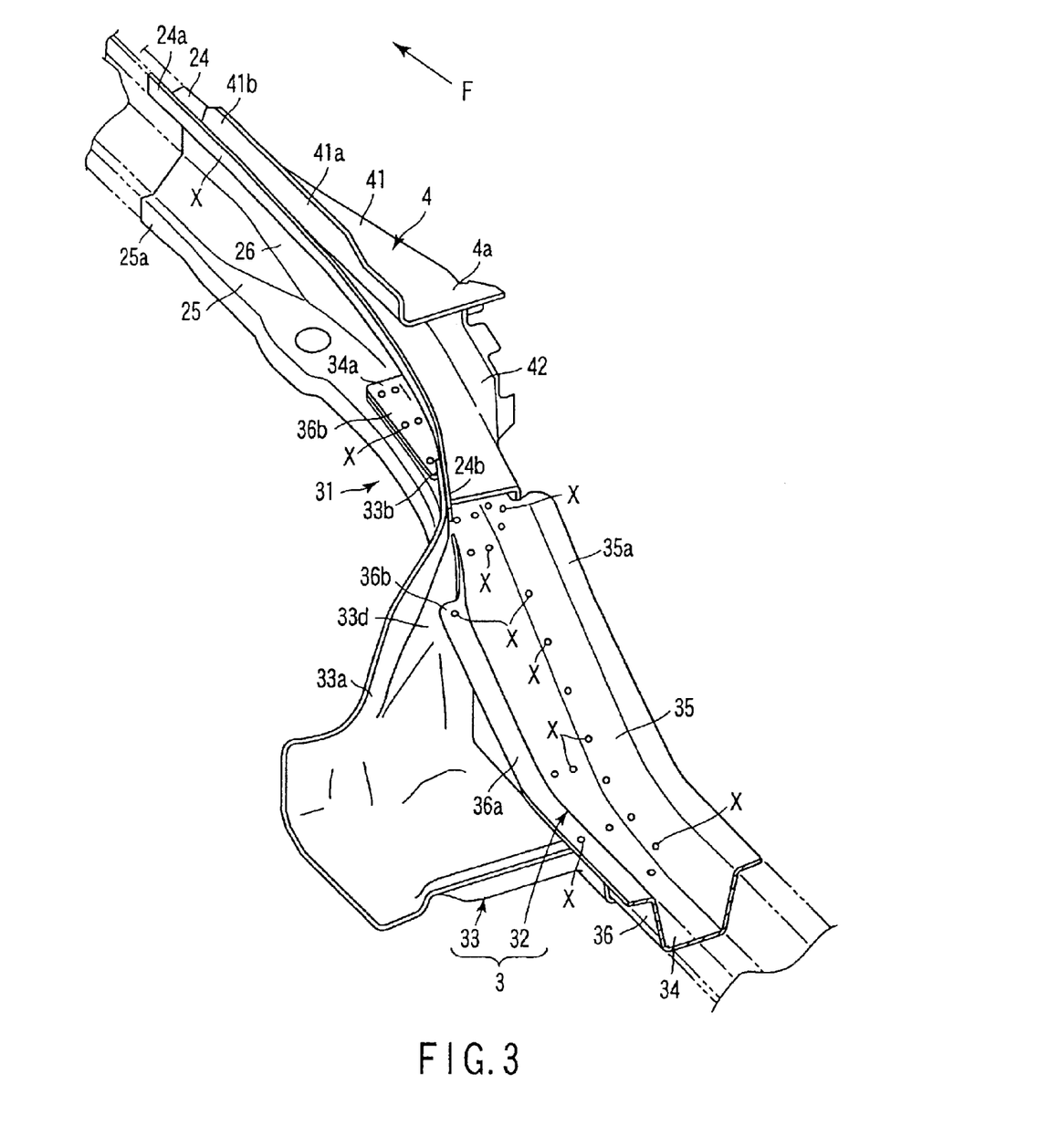
FIG. 3 is a perspective view of the side member of FIG. 1 cleared of its outer, taken frontally from outside and above the vehicle interior.
Figure 4:
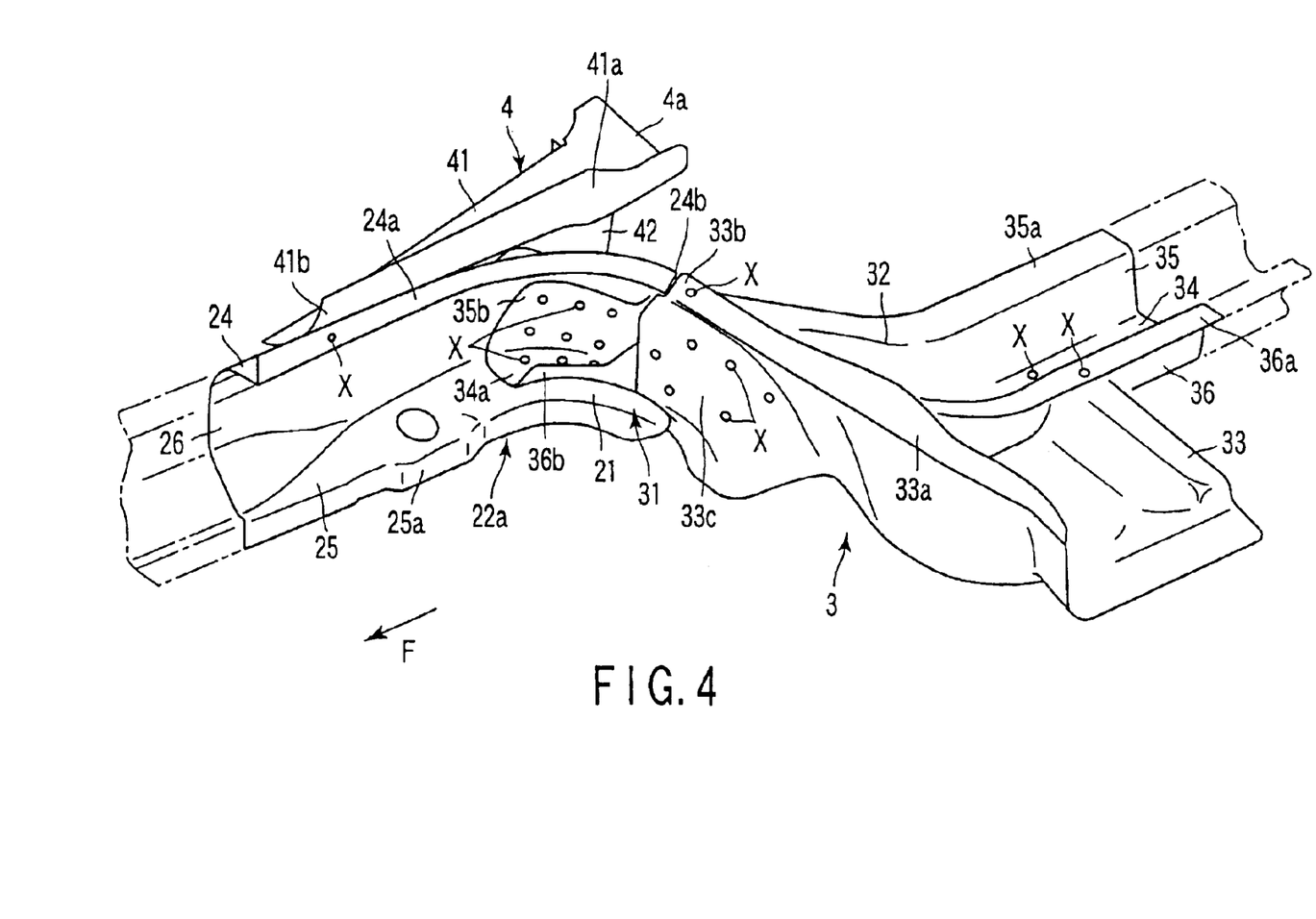
FIG. 4 is a perspective view of the side member of FIG. 1 cleared of its outer, taken dorsally from outside and above the vehicle interior.

The rear side member 3 is provided with an upper 32 and a lower 33. The upper 32 has a bottom wall 34, a rear inside wall 35, and a rear outside wall 36. The lower 33 is attached so as to cover, from below, that part of the upper 32 which is located ahead of the position behind the upwardly bent portion (bend 32a) of the upper 32 as a bend of the rear side member 3. As shown in FIGS. 3 and 4, the upper 32 and the lower 33 are jointed together at their respective overlapping portions. The rear side member 3 is interposed between the inner 22 and the outer 23. The upper 32 penetrates the front side member 2 to a position in front of the lower 33.

Figure 8:
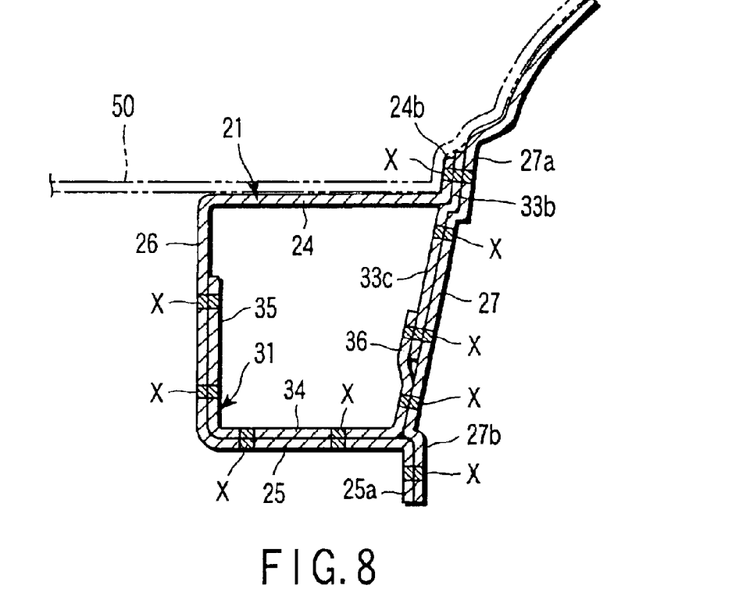
FIG. 8 is a sectional view of the side member taken along line F8—F8 of FIG. 5.

As shown in FIGS. 3 and 4, the bottom wall 34 of the upper 32 is jointed to the lower front wall 25 of the inner 22. The rear inside wall 35 of the upper 32 is jointed to the front inside wall 26 of the inner 22. The rear outside wall 36 of the upper 32 is jointed to the front outside wall 27 of the outer 23. A lower upward flange 33a is provided on the outside edge of the lower 33. As shown in FIG. 8, a front end 33b of the lower upward flange 33a is interposed between and jointed to a rear end 24b of the inner upward flange 24a and the outer upper flange 27a.

The rear inside wall 35 of the upper 32 has an upper inward flange 35a that extends inward from the upper edge.

The rear outside wall 36 of the upper 32 is provided with an upper outward flange 36a that extends outward from the upper edge. The upper inward flange 35a and the upper outward flange 36a are located within a range behind that part which penetrates the front side member 2. A front end 36b of the upper outward flange 36a is jointed to a rack portion 33d, which is provided between the lower upward flange 33a of the lower 33 and the upper end of a lower outside wall 33c that overlaps the rear outside wall 36. Further, the upper inward flange 35a and the upper outward flange 36a are jointed to the dash panel 50 from outside the vehicle interior. The upper 32 defines a closed section between itself and the dash panel 50.

Figure 6:
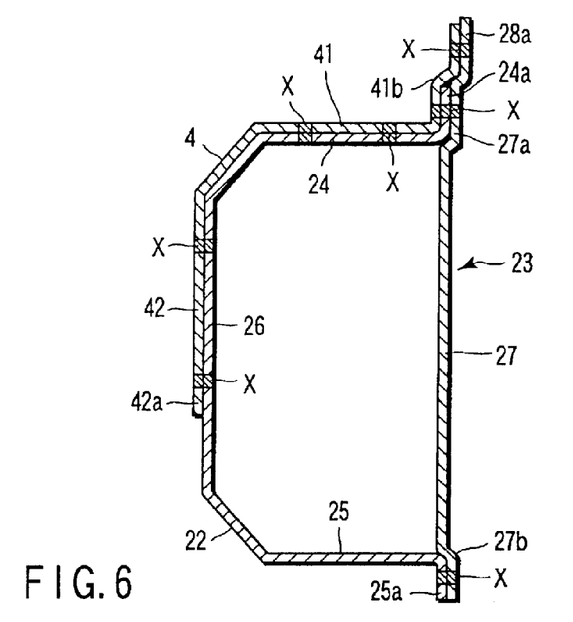
FIG. 6 is a sectional view of the side member taken along line F6—F6 of FIG. 5.
Figure 7:
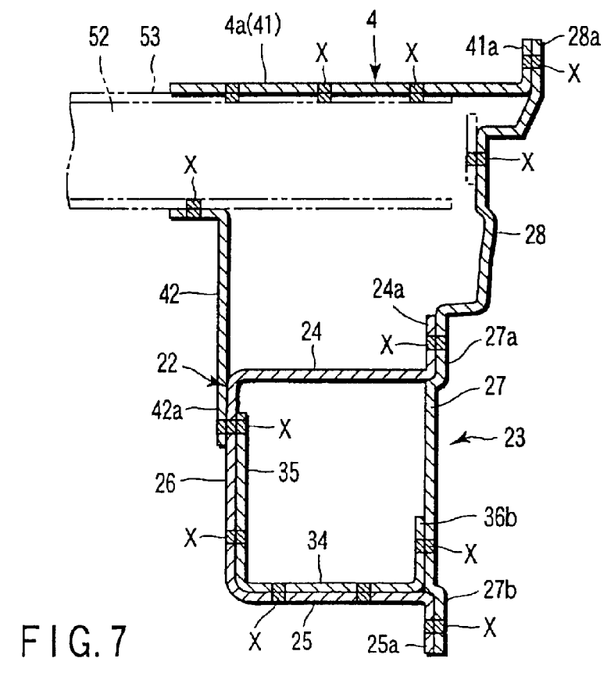
FIG. 7 is a sectional view of the side member taken along line F7—F7 of FIG. 5.

The brace 4 is provided with a brace upper wall 41 and a brace inside wall 42, which extends rearward along the upper front wall 24 and the front inside wall 26, respectively, ahead of a bend 22a of the inner 22 that forms a bend of the front side member 2. A rear end 4a of the brace 4 abuts against the vertical wall 51 of the dash panel 50. The brace 4 is provided with a brace upward flange 41a that extends upward from the outside edge of the brace upper wall 41. The brace upward flange 41a is jointed to the inner upward flange 24a at its front end 41b, and is also jointed to the upper edge flange 28a of the outer 23, extending beyond the inner upward flange 24a, as shown in FIG. 6. Further, a front end 41c of the brace upper wall 41 is jointed to the upper front wall 24 of the inner 22, while the brace inside wall 42 is jointed to the front inside wall 26 of the inner 22. As shown in FIG. 7, the rear end 4a of the brace 4 is jointed to an upper wall 53 of a cross member 52, which extends in the crosswise direction of the vehicle body along the vertical wall 51 of the dash panel 50. The brace 4, inner 22, and outer 23 define a two-stage closed section on that part of the dash panel 50 outside the vehicle interior. Therefore, this part is reinforced.

The following is a description of an example of the sequence of assembly of the side member 1. First, those parts of the upper front wall 24 and the front inside wall 26 which are located ahead of the bend 22a of the inner 22 are jointed to a front end 4b of the brace 4, while that part of the front inside wall 26 which is situated within the range of the bend 22a and a lower edge 42a of the brace inside wall 42 are jointed together. Further, the respective overlapping portions of the upper 32 and the lower 33 (see FIG. 3). The front end 36b of the upper outward flange 36a and the rack portion 33d may be jointed in this stage or when the side member 1 is jointed to the dash panel 50. The upper 32 and the lower 33 that are assembled into the rear side member 3 are attached to the inner 22 from outside in the crosswise direction of the vehicle body.

Figure 9:
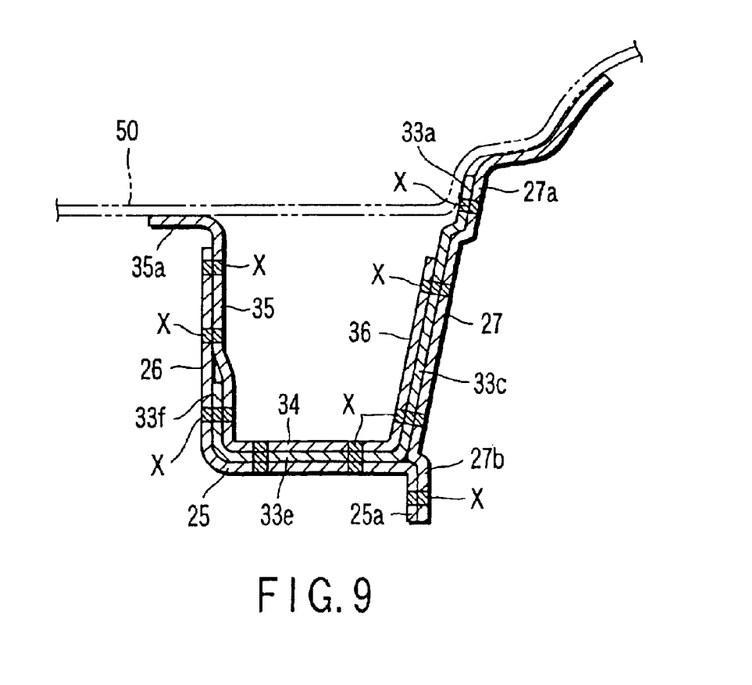
FIG. 9 is a sectional view of the side member taken along line F9—F9 of FIG. 5.

In this stage, the lower front wall 25 and a front end 34a of the bottom wall 34 are jointed together, as shown in FIG. 3, while the front inside wall 26 and the lower edge 42a of the brace inside wall 42 are jointed to a front end 35b of the rear inside wall 35. As shown in FIG. 9, a rear end 25b of the lower front wall 25 is jointed to a front end lower part 33e of the lower 33 and the bottom wall 34 of the upper 32, while a rear end 26a of the front inside wall 26 is jointed to a front end inside 33f of the lower 33 and the rear inside wall 35 of the upper 32. The front end 33b of the lower upward flange 33a and the rear end 24b of the inner upward flange 24a may be jointed in this stage or when the side member 1 is jointed to the dash panel 50.

Finally, the outer 23 is attached from outside in the crosswise direction of the vehicle body. In this stage, the inner upward flange 24a and the outer upper flange 27a are jointed together, as shown in FIGS. 6 to 8. As shown in FIGS. 6 and 7, the upper edge flange 28a of the outer 23 and the brace upward front 41a are jointed together. As shown in FIGS. 6 to 9, the inner downward flange 25a and the outer lower flange 27b are jointed together. As shown in FIGS. 8 and 9, the lower upward flange 33a (33b) and the outer upper flange 27a are jointed together. As shown in FIG. 7, the front outside wall 27 and the front end 36b of the rear outside wall 36 are jointed together. As shown in FIGS. 8 and 9, the front outside wall 27 is jointed to the lower outside wall 33c of the lower 33 and the rear outside wall 36 of the upper 32.

Based on this assembly, the jointing can be achieved by the spot welding only. The spot welding may be replaced with MIG welding, TIG welding, or YAG welding.

In the side member 1 constructed in this manner, the front side member 2 extends rearward beyond the dash plane D, while the rear side member 3 extends forward beyond the dash plane D and is jointed to the front side member 2. Further, the front side member 2 of which the closed section is composed of the upper front wall 24, lower front wall 25, front inside wall 26, and front outside wall 27 is smoothly continuous with the rear side member 3 of which the closed section is composed of the bottom wall 34, rear inside wall 35, rear outside wall 36, and dash panel 50. Thus, a frontal load, such as a head-on collision, can be accurately transmitted rearward.

The individual members are lapped on one another when they are jointed together. If any load, such as a bending, tensile, or torsional load, acts on the side member, therefore, the load that acts on each joint X is a shear load. At each joint X between the front side member 2 and the rear side member 3, in particular, the members are jointed to each other covering at least two adjacent faces. The bends 22a and 32a are jointed together with a plurality of members superposed. Thus, the side member 1 as a simple is highly stiff or rigid.

According to the side member of the present invention, the side member as a simple has high stiffness or rigidity to resist bending, pull, and torsion. The side member has strength high enough to enhance the rigidity of the front part of the vehicle body without depending on the strength of assembly with the cross member.

Since the rear side member is interposed between the inner member and the outer member, moreover, the respective closed sections of the front side member and the rear side member are continuous with each other. Thus, the load on the front side member can be easily transmitted to the rear side member with accuracy.

Further, the front side member and the rear side member are enhanced in stiffness or rigidity, each having a plurality of members superposed at the joints and bend.

What is claimed is:

1. A side member, which is a complement of a pair located on either side of a vehicle and extending in a longitudinal direction thereof and adapted to extend under a dash panel located in the front part of the interior of the vehicle, the side member comprising:

a front side member adapted to extending rearwardly, from the front of the vehicle, beyond a dash plane, which extends along a substantially vertical wall of the dash panel; and a rear side member adapted to extend forwardly, from the rear of the vehicle, beyond the dash plane, and having a surface extending in the longitudinal direction of the vehicle and overlapping with and joined to the front side member, wherein the front side member includes an inner member having an upper front wall, a lower front wall, and an inside front wall, and an outer member having an outside front wall, wherein the inner member and the outer member form a first closed section, wherein the rear side member includes an upper member having a bottom wall, an inside rear wall, and an outside rear wall, wherein the upper member is adapted to form a second closed section with the dash panel, wherein the bottom wall is joined to the lower front wall, the inside rear wall is joined to the inside front wall, and the outside rear wall is joined to the outside front wall in the vicinity of the dash plane, and wherein the first closed section continuously connects to the second closed section.

2. A side member according to claim 1, further comprising a brace member having one end side joined to the front side member and another end side for joining to the vertical wall of the dash panel.

3. A side member according to claim 2, wherein the front side member and the brace member form a third closed section between each other and is adapted to be positioned in the vicinity of the dash panel.

4. A side member according to claim 3, wherein the third closed section is arranged above the first closed section.

5. A side member according to claim 1, wherein the rear side member has a front end portion penetrating an inside space surrounded by the inner member and the outer member.

6. A side member according to claim 5, wherein the rear side member further includes a lower member covering the upper member from below, and wherein the front end of the rear side member includes the bottom wall, the inside rear wall, and the outside rear wall, the bottom wall thereof being joined to the lower front wall, the inside rear wall thereof being joined to the inside front wall, and the outside rear wall thereof being joined to the outside front wall, with part of the lower member positioned between the front side member and the upper member.

7. A side member, which is a complement of a pair located on either side of a vehicle and extending in a longitudinal direction thereof, and adapted to extend under a dash panel located in a front part of the interior of the vehicle, the side member comprising:
 a front side member adapted to extend rearwardly, from the front of the vehicle, beyond a dash plane, which extends along a substantially vertical wall of the dash panel;
 a rear side member adapted to extend forwardly, from the rear of the vehicle, beyond the dash plane, and having a surface extending in the longitudinal direction of the vehicle and overlapping with and joined to the front side member; and
 a brace member having one end side joined to the front side member and another end side for joining to the vertical wall of the dash panel,
 wherein the front side member includes an inner member having an upper front wall, a lower front wall, and an inside front wall, and an outer member having an outside front wall, and
 wherein the brace member is joined to the inside front wall and an upper edge flange, which is provided on the outer member of the front side member.

8. A side member, which is a complement of a pair located on either side of a vehicle and extending in a longitudinal direction thereof, and adapted to extend under a dash panel located in a front part of the interior of the vehicle, the side member comprising:
 a front side member adapted to extend rearwardly, from the front of the vehicle, beyond a dash plane, which extends along a vertical wall of the dash panel; and
 a rear side member adapted to extend forwardly, from the rear of the vehicle, beyond the dash plane and having a surface extending in the longitudinal direction of the vehicle and overlapping with and joined to the front side member,
 wherein the front side member includes an inner member having an upper front wall, a lower front wall, and an inside front wall, and an outer member having an outside front wall,
 wherein the rear side member has a front end portion penetrating an inside of space surrounded by the inner member and the outer member,
 wherein the front end of the rear side member includes a bottom wall, an inside rear wall, and an outside rear wall, the bottom rear wall being joined to the lower front wall, the inside rear wall being joined to the front inside wall, and the outside rear wall being joined to the outside front wall, and
 wherein the rear side member includes an upper member having the bottom wall, the inside rear wall, and the outside rear wall, for defining a closed section in cooperation with the dash panel, and a lower member covering the upper member from below.

9. A side member according to claim 8, wherein the upper member penetrates the front side member to a position in front of the lower member.

10. A side member according to claim 8, wherein the lower member is provided with a lower upward flange on the outside edge thereof, the front end of the lower upward flange being interposed between the rear end of an inner upward flange on the outside edge of the upper front wall of the inner member and an outer upper flange on the upper side of the front outside wall of the outer member.

11. A side member according to claim 8, wherein the lower member extends outwardly from the rear outside wall of the upper member, for joining to the outside end of the dash panel.

12. A side member according to claim 10, wherein the upper member has an upper outward flange on the upper edge of the rear outside wall, the front end of the upper outward flange for joining to a rack portion provided between the lower upward flange and the upper end of a lower outside wall overlapping the rear outside wall.

13. An automobile comprising:
 a vehicle body having a dash panel located in an interior front part thereof and a dash plane, which extends along a substantially vertical wall of the dash panel; and
 a side member comprising:
  a front side member passing under the dash plane from the front of the vehicle body and extending rearward; and
  a rear side member passing under the dash plane from the rear of the vehicle body and extending forward,
  wherein the front side member and the rear side member are joined together with portions of the front and rear side members, overlapping each other in the longitudinal direction of the vehicle,
  wherein the front side member includes an inner member having an upper front wall, a lower front wall, and an inside front wall, and an outer member having an outside front wall, wherein the inner member and the outer member form a first closed section, wherein the rear side member includes an upper member having a bottom wall, an inside rear wall, and an outside rear wall, wherein the upper member forms a second closed section with the dash panel, wherein the bottom wall is joined to the lower front wall, the inside rear wall is joined to the inside front wall, and the outside rear wall is joined to the outside front wall in the vicinity of the dash plane, and wherein the first closed section continuously connects to the second closed section.

14. An automobile according to claim 13, wherein:

the rear side member further includes a lower member positioned below the upper member, and has a front end portion including the bottom wall, the inside rear wall, and outside rear wall, the front end portion of the rear side member penetrates an inside space surrounded by the inner member and the outer member, and the bottom wall is joined to the lower front wall, the inside rear wall is joined to the inside front wall, and the outside rear wall is joined to the outside front wall, with part of the lower member positioned between the front side member and the rear side member.

* * * * *